UNITED STATES PATENT OFFICE.

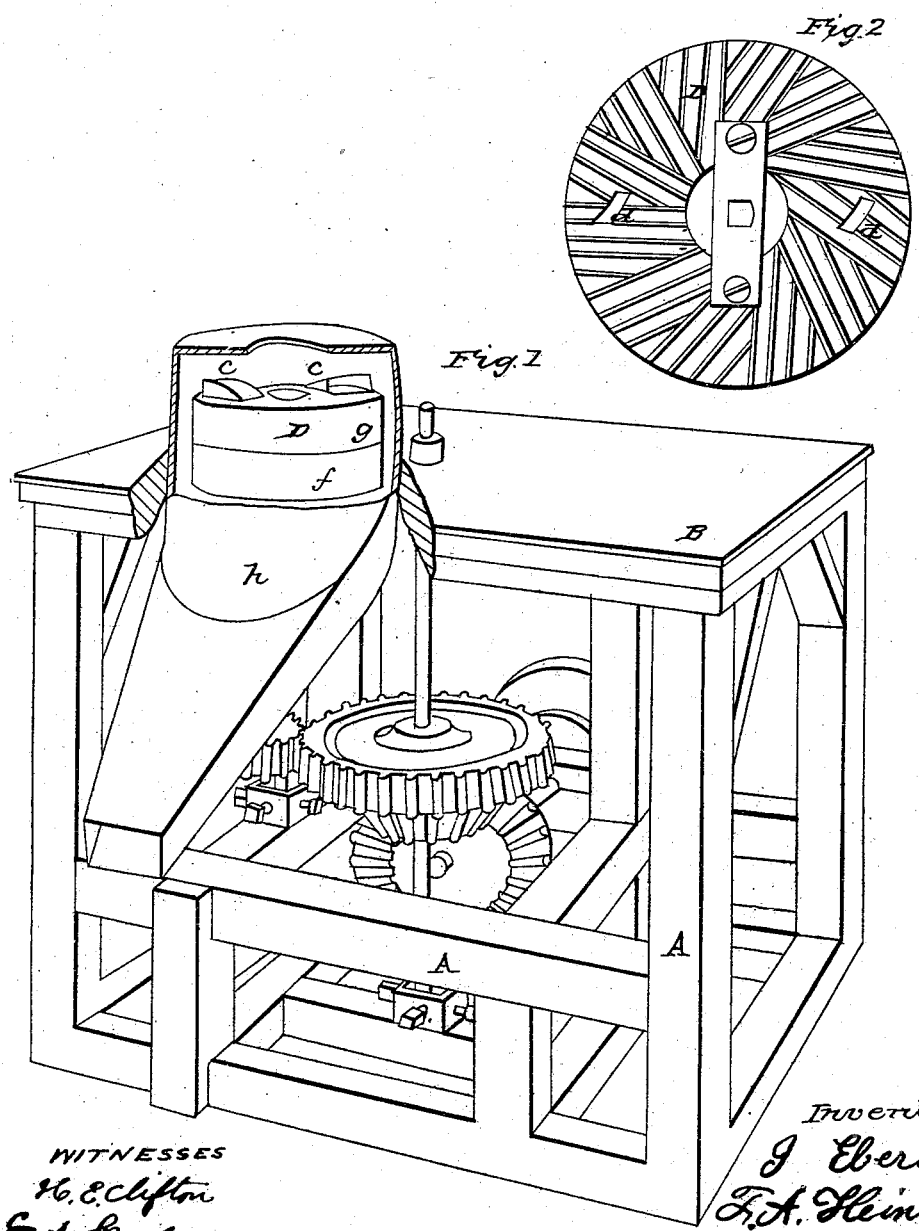

G. EBERIUS AND F. A. HEINIG, OF WASHINGTON, MISSOURI.

IMPROVEMENT IN GRINDING-MILLS.

Specification forming part of Letters Patent No. 39,558, dated August 18, 1863.

*To all whom it may concern:*

Be it known that we, G. EBERIUS and F. A. HEINIG, of Washington, in the county of Franklin and State of Missouri, have invented a new and useful Improvement in Grinding-Mills; and we do hereby declare that the following is a full and clear description thereof, reference being had to the accompanying drawings, and to the letters of reference marked thereon, and made to form a part of this specification.

It is a well-known fact that much difficulty and inconvenience have been experienced by the heating of flour and meal by grinding in the ordinary way, and that flour and meal so produced are liable to much damage if allowed to remain in bulk, or if packed in barrels, soon after grinding, in consequence of being heated during the process of grinding.

The object of our invention is to obviate the difficulties above mentioned, or, in other words, to prevent the heating of flour or meal during the process of grinding; and the nature of our invention relates, first, to the introduction of a current of air between the grinding-surfaces of the stones during the process of grinding, and, secondly, to the construction and arrangement of a receiver, into which the flour falls after being ground, as hereinafter set forth and represented.

In reference to the accompanying drawings, Figure 1 is a perspective view of our improvement, representing the same as ready for use. Fig. 2 is a bottom view or plan of the upper or runner stone, showing specially the apertures through which air may be forced.

A represents the frame-work below the main floor B of the mill, which is similar to that of ordinary structures for like purposes.

The manner of picking, arranging, and operating the stones for grinding purposes may be the same as in ordinary grinding-mills.

D represents the running-stone, through which will be formed apertures, $d$, (shown in Fig. 2,) running diagonally from the upper to the lower surface of the stones.

$c$ represents hoods, firmly attached to the upper surface of the stone D, over the upper ends of the apertures $d$, which will be arranged with their larger and open ends in the direction of the rotation of the said stone D, so that, in the operation of the mill, the air which enters the mouths or open ends of said hoods $c$ will be forced by the rotation of the said stone through the apertures $d$ down between the grinding-surfaces of the stones D and $f$ among the mass which is being ground. Thus a strong current of cool air will be constantly forced among the flour or meal during the process of grinding, and made to escape with the same into the receiver $h$ below, thereby preventing the mass being ground from becoming heated, and cooling the same during its discharge from the stones and passage down the receiver $h$, in such manner that the same, after being properly bolted, may be immediately packed for future use without danger of damage from heating. The said hoods $c$ may be formed of wood or metal, but I prefer metal, as being best adapted to the purpose. The upper portion of the receiver $h$ is formed circular, of a diameter somewhat larger than that of the stones D $f$, so as to be adapted to receive the ground mass from all parts or points of the circumference of said stones. A small open space, $g$, will be left around the stones, so that the ground mass may be discharged therefrom at all points of their circumference. The advantage of this arrangement is that the ground mass, instead of being carried around with the runner D, so as to be discharged at a particular point, will fall gradually in small bulk all around the stones, during which operation it will be cooled by the air which comes through the apertures $d$, and escapes with the ground mass into the said receiver $h$. The lower portion of the said receiver will be made to incline, so that the ground mass will descend by its own gravity.

We do not wish to confine the use of our invention to stone grinding-surfaces, as it is equally adapted to metal; neither do we wish to be confined to the particular form or position for the hoods $c$, or to the particular direction of the apertures $d$, as it is obvious the same may be varied and still effect the same result; but

Having thus described the nature and application of our invention, what we claim, and desire to secure by Letters Patent, is—

The introduction of a continuous current of air between the grinding-surfaces of millstones, in combination with the open space $g$ and receiving-chamber $h$, all being constructed and arranged substantially as and for the purposes set forth.

In testimony of which invention we have hereunto set our hands and seals, this 16th day of June, 1863.

G. EBERIUS. [L. S.]
F. A. HEINIG. [L. S.]

Witnesses:
H. E. CLIFTON,
E. A. SKEELE.